April 18, 1944.     P. R. HORNBROOK     2,347,105
CONVEYING APPARATUS
Filed June 19, 1941     3 Sheets-Sheet 1
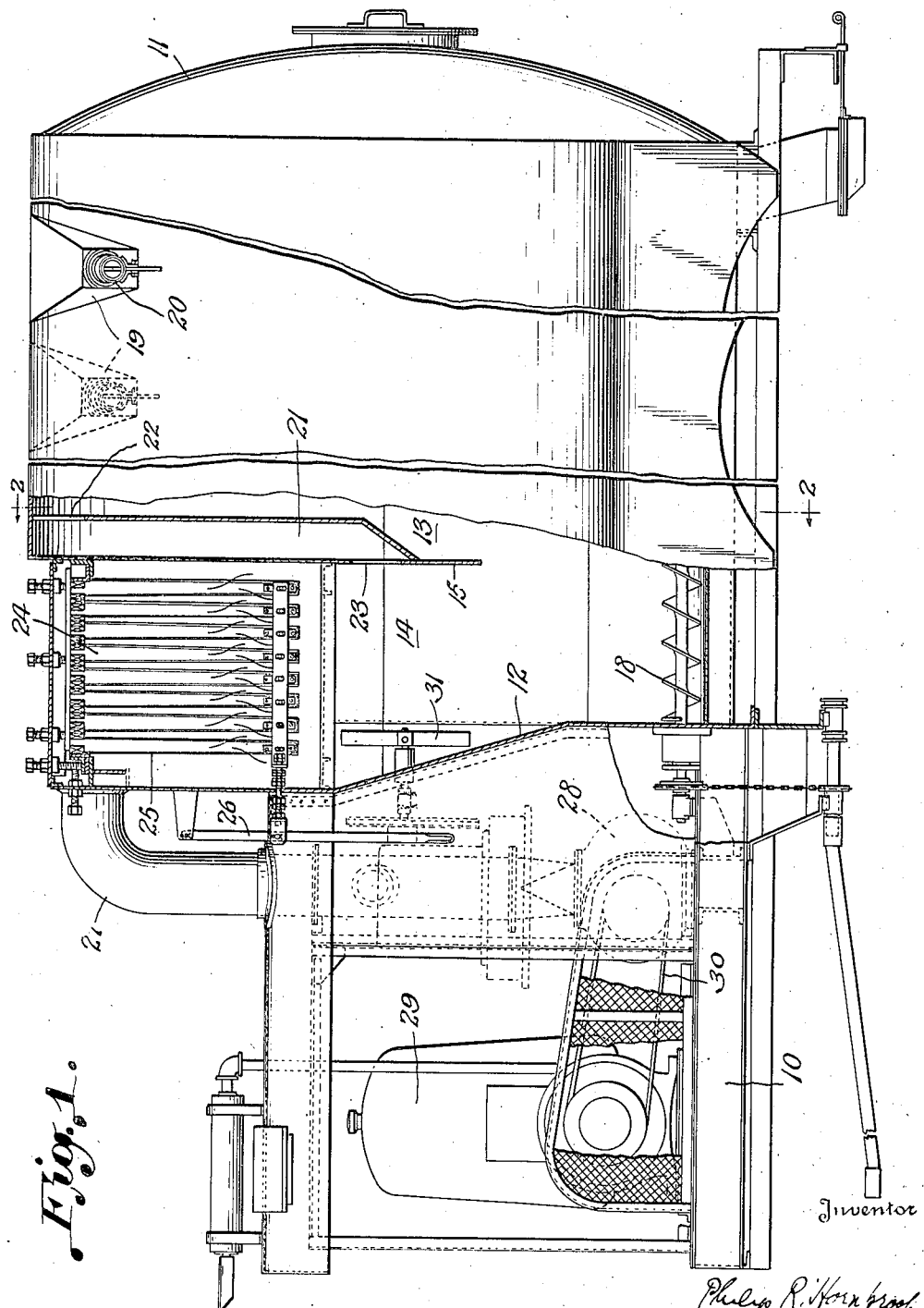

April 18, 1944. P. R. HORNBROOK 2,347,105
CONVEYING APPARATUS
Filed June 19, 1941 3 Sheets-Sheet 2
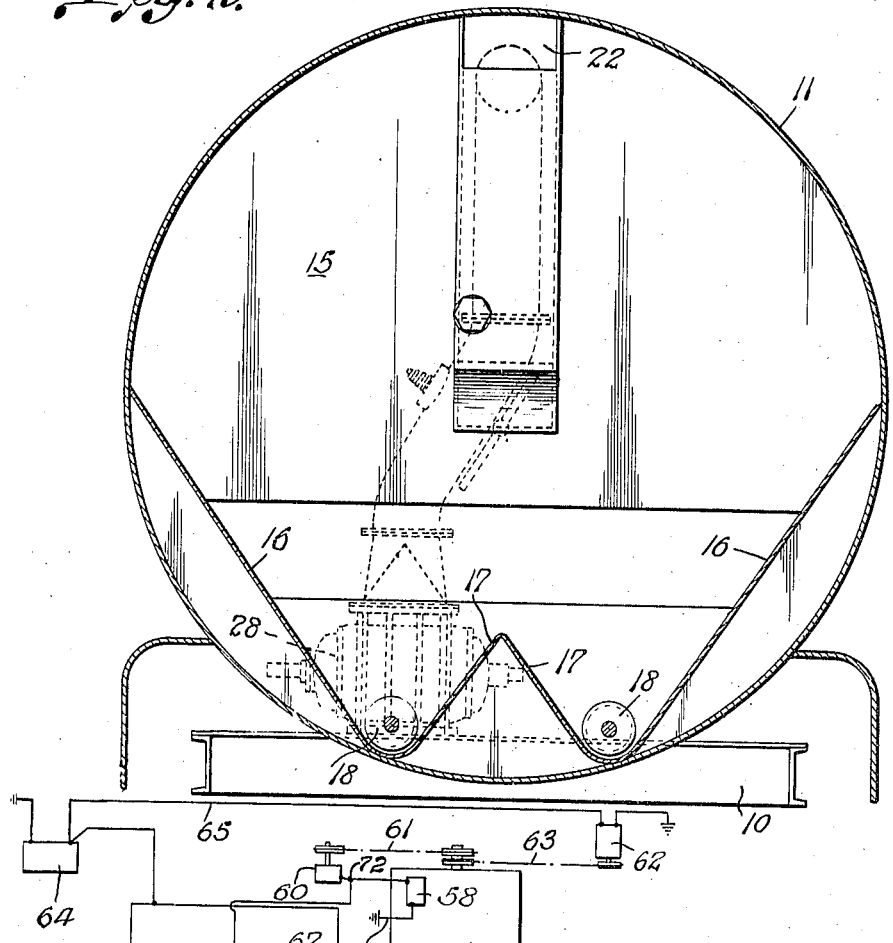
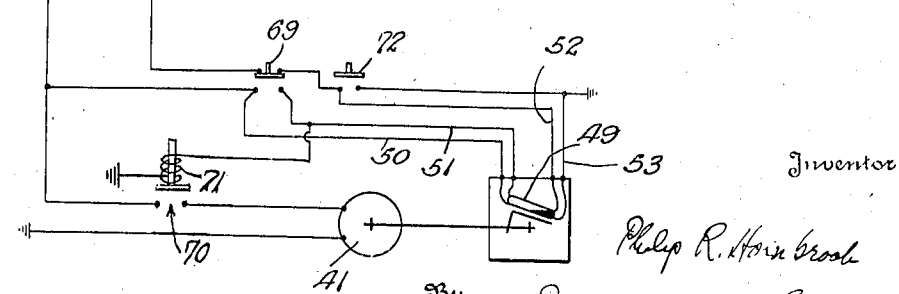

April 18, 1944.　　　P. R. HORNBROOK　　　2,347,105
CONVEYING APPARATUS
Filed June 19, 1941　　　3 Sheets-Sheet 3
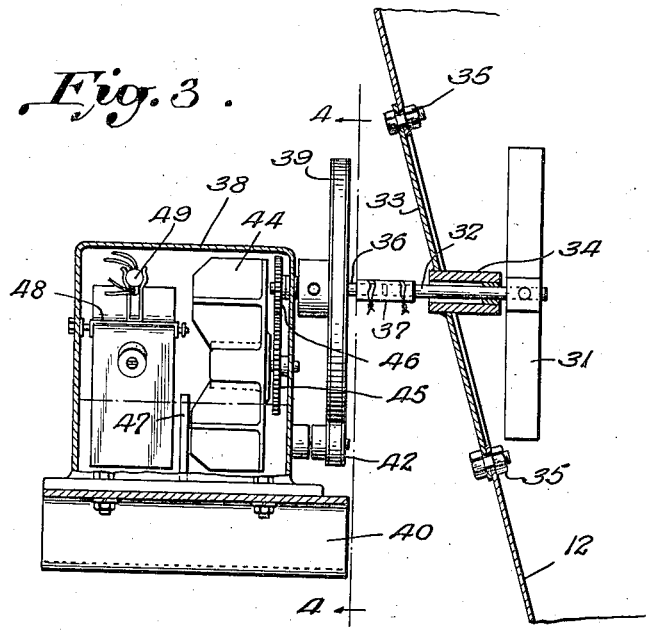
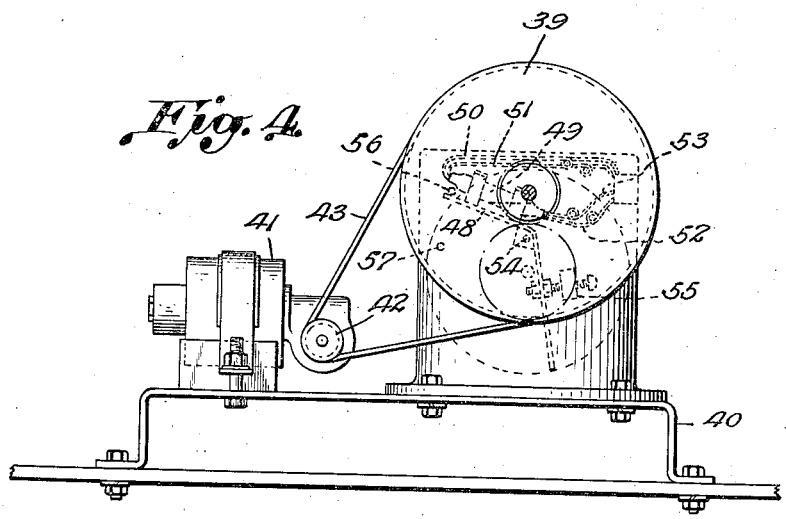
Inventor
Philip R. Hornbrook Patented Apr. 18, 1944

2,347,105

UNITED STATES PATENT OFFICE 2,347,105

CONVEYING APPARATUS

Philip R. Hornbrook, Allentown, Pa., assignor to Fuller Company, Catasauqua, Pa., a corporation of Delaware Application June 19, 1941, Serial No. 398,707

5 Claims. (Cl. 302—59)

This invention relates to apparatus for pneumatically conveying pulverulent, granular, and crushed materials and of the type which includes a collector or receiver connected by a conduit to a source of material, an exhauster for maintaining a partial vacuum in the receiver and causing a flow of air and entrained material through the conduit and into the receiver, and a filter in the receiver for removing fine particles from the air before the latter passes out of the receiver. More particularly, the invention is concerned with novel means for controlling the conveying apparatus, so that conveying is stopped when a quantity of material equal to the intended capacity of the receiver has been deposited therein, the control means thus preventing overloading of the receiver and damage to the filter by reason of the entrance of heavy material into the filter or the building up of such material in contact with the filter. The new control means is of general utility in conveying apparatus of the kind referred to, as will be readily apparent, but, for purposes of explanation, its use in connection with a portable conveyor only will be described.

In the transfer of pulverulent, granular, and crushed materials, such as grain, grits, etc., from cars at freight sidings to storage bins remote from the sidings or from one storage point to another distant therefrom, it is the usual practice to transport the material from the cars or storage points to the desired destination by mobile tank trucks. These trucks are usually provided with an exhauster having an inlet suitably connected with the tank, so that a partial vacuum can be maintained within the latter. A flexible conduit is connected at one end to the tank inlet and the partial vacuum maintained within the tank causes a flow of air and material into the tank through the conduit. The other end of the conduit may be attached to a permanent line into which the material is fed, but is ordinarily provided with a suitable nozzle which may be embedded in the material, so that the latter is picked up in the usual way. The tank has a storage compartment and a filtering compartment partially separated by a dividing wall and, upon entrance of the stream of air and material into the tank, the heavier particles drop out of the air stream and are deposited in the storage compartment. The air then flows in a tortuous path through an opening in the dividing wall to the filtering compartment where fine dust remaining in suspension is removed by suitable filters.

In the use of such an apparatus, it is difficult for the operator to determine when the storage compartment has been filled to capacity and an error in judgment on his part will lead to objectionable results. Thus, if the operator fails to fill the storage compartment completely, the truck will carry only a partial load and a loss of economy will follow, since the truck will be required to make additional trips to transfer the desired total quantity. If the operator errs by permitting the conveying operation to continue after the storage compartment has been filled beyond its intended capacity, the exhauster is likely to draw heavy material up into the filter and cause damage to the latter.

The problem thus presented is the provision of means which will stop the conveying operation in an apparatus of this type after the storage compartment has become full and before heavy material is drawn into the filter. Since in the conveying of many materials, the air entering the filter contains fine dust and is a readily combustible mixture, a suitable control for the purpose described must also be one which will not cause ignition of that mixture.

In one prior construction, portions of the tank wall are replaced by transparent plates, so that the operator can watch the material rise within the tank. This expedient, however, is not satisfactory because the turbulence of the material as it is thrown from the air stream, together with the movement of the fine particles, causes actual conditions within the tank to be obscured. Another objection to the use of such transparent plates is that the operator must remain at the tank throughout the conveying operation and, if the apparatus includes a flexible hose with an intake nozzle, an additional employee for handling the nozzle is necessary.

The present invention is, accordingly, directed to the provision of means for controlling the operation of a conveying apparatus in which material is caused to flow through a conduit into a receiver by differential pressure and in which a filter is employed within the receiver, the new control means insuring operation of the system so that the storage compartment of the receiver will be completely filled and at the same time preventing damage to the filter by reason of entrance of heavy material into the latter.

The control means of the invention comprises a member, such as a paddle, mounted for rotation within the exhaust compartment of the tank below the filter on a shaft which extends through the tank wall and is operatively connected to the paddle wheel of a motion switch. The shaft is rotated by a suitable means which is effective so long as the material within the exhaust compartment is out of contact with the paddle. The motion switch includes a switch element in the control circuit of the driving means for the exhauster producing the partial vacuum within the tank, and so long as the paddle wheel shaft is rotating, the switch element occupies a position such that the control circuit may be utilized to start the driving means for the exhauster and continue it in operation. When the material collected in the tank has reached such a height as to prevent rotation of the paddle, the shaft and the paddle wheel of the motion switch stop rotating. The switch element thereupon moves to a position which results in the control circuit of the exhauster driving means being placed in a condition which causes the operation of the exhauster to stop.

For a better understanding of the invention, reference may be made to the accompanying drawings in which Fig. 1 is an elevation of a general assembly of the conveying apparatus with parts broken away to disclose details;

Fig. 2 is a sectional view taken on lines 2—2 of Fig. 1;

Fig. 3 is an enlarged view partly in section showing the details of the motion switch and paddle;

Fig. 4 is an elevation taken on lines 4—4 of Fig. 3, and looking in the direction of the arrows; and Fig. 5 is a schematic wiring diagram of the control circuit of the exhauster driving means including the motor switch.

Referring now to the drawings, the apparatus illustrated will be seen to include a chassis 10 adapted to be suitably mounted upon any desired type of mobile means. A tank 11 having a front wall 12 and partially divided into a storage compartment 13 and an exhaust compartment 14 by wall 15, which extends downwardly from the top of the tank to a point spaced from the bottom, is mounted upon the chassis 10 in a suitable manner. The tank is provided with a false bottom having sloping side walls 16 and interior sloping walls 17 which form longitudinal troughs to facilitate removal of the material from the tank by a screw 18 positioned in the bottom of each trough.

A pair of material inlet spouts 19, one on each side, are provided adjacent the top of the tank above the storage compartment and are positioned to direct the stream of air and material transversely of the compartment whereby the heavy particles as they enter the compartment are thrown from the entraining air stream. Connections 20 at the exterior end of the spouts are adapted to receive one end of a flexible hose (not shown) through which the material and air flows to the tank.

Upon entrance of the material to the tank, the heavy particles drop to the bottom of the storage compartment. Initially this compartment communicates with the exhaust compartment below the dividing wall 15 and the entraining air is free to flow to this latter compartment in this path. Although the heavy particles fall from the air stream upon entrance to the tank, sufficient air temporarily remains with these particles to cause the deposited mass to be more or less free flowing so that the material flows into the exhaust compartment until the level of deposited material reaches the bottom of the dividing wall 15 after which the communication between the two compartments below the wall is substantially closed. A chute 21 extending from the top of the tank downwardly along the dividing wall 15 communicates with the storage compartment at its extreme upper end through opening 22. The lower end of the chute communicates with the upper portion of the exhaust compartment through opening 23, and upon a rise of the heavy material particles in the bottom of the tank to close the communication between the two compartments below the wall 15, the entraining air travels to the exhaust through the chute 21.

A filter, designated broadly at 24, provided with filter bags 25 and a shaker 26, is positioned in the upper portion of the exhaust compartment in a manner to require the entraining air to pass through the bags before reaching the exhaust duct 27. By the use of such filter means, the fine particles which remain in suspension are removed from the air stream and, upon operation of the shaker, the fine particles drop to the bottom of the compartment.

The exhaust duct 27 is connected to the intake side of an exhauster 28, which is preferably of the blower type. The exhauster is driven, in the apparatus illustrated, by an internal combustion engine 29 connected thereto by a belt 30, and when the exhauster is being driven by the engine, a steady flow of air is drawn through the filter. The exhauster and engine are attached to the chassis in any suitable way to reduce vibration, as much as possible.

Operation of the apparatus thus far described is as follows. Assuming that the material is to be transferred from a storage bin or box car to the tank, a flexible hose of suitable length has one end connected to one of the tank inlets and its other end, which may carry a nozzle designed to efficiently mix the air and material, placed in the material pile. When the exhauster engine is started and the exhauster is in operation, the air is drawn out of the tank and this causes a flow of air through the hose of sufficient velocity to entrain the material to the storage compartment. During the early operation of the conveying, the heavy particles are thrown from the air stream and deposited along the entire bottom of the tank below both compartments, the entraining air with those particles which remain in suspension passing around the dividing wall and to some extent through the chute in their travel to the exhaust compartment, the air passing through the filters and out to the exhaust duct. When the deposited material rises to the level of the bottom of the dividing wall, the flow of material and air below the wall to the exhaust compartment ceases, and substantially the entire quantity of entraining air passes through the chute in its travel to the filter. As the conveying continues, the entraining air passes to the chute without difficulty until the level of material reaches the upper opening of this chute. Conveying beyond the point has the effect of restricting the inlet to the chute, thereby causing the heavy material to flow into this chute and also increasing the vacuum in the exhaust compartment, which results in drawing of the material from the storage compartment into the exhaust compartment through the opening below the dividing wall. A certain amount of material in this compartment above the bottom of the dividing wall is not objectionable, in fact, may be desirable, to insure a maximum load, but if the conveying operation continues too long after the storage compartment is filled, the heavy material rises to fill the spaces around the bags in the filter. As these bags are usually made of fabric, contact with this heavy material together with the strain resulting from the continually increasing vacuum developed as the material rises to block the filter, causes early destruction of these members.

In order to permit full loading of the tank and yet prevent the rising of the heavy material into and about the filter, with its deleterious effect, the present apparatus is provided with means to control the operation of the system so as to halt the conveying when a desired quantity of material has been deposited in the tank.

The control means includes a paddle 31 carried at one end of a shaft 32 and positioned in the exhaust compartment below the filter. The shaft extends to the outside of the tank through an opening in the end wall 12 and a detachable plate 33 covering the opening is provided with a dust-proof bearing 34 to support the shaft and insure against leakage of material at this point. The size of the opening in the end wall covered by the detachable plate is made large enough to permit removal of the assembled paddle and shaft upon removal of the plate clamping bolts 35. A flexible coupling 37 connects the end of the shaft 32 to one end of a shaft 36 which is rotatably mounted in one wall of the casing 38 of a motion switch, to be described later, and has mounted fast thereon a grooved pulley wheel 39. A bracket 40 supports the motion switch and a small electric motor 41, also supported by this bracket, is adapted upon operation to drive the pulley wheel 39 through a suitable gear reduction (not shown), pulley 42, and belt 43. The belt and pulley contact is so related as to permit slippage of the belt under certain conditions, as will be developed later. Although the pulley is driven by the motor 41, it will be obvious that other means may be used, such as a power take-off from the exhauster or the driving means therefor.

The motion switch will be seen to comprise a paddle wheel 44 suitably journalled in the casing 38 and driven through gears 45 and 46 upon rotation of the shaft 36. A quantity of oil or other liquid is provided in the lower portion of the casing and upon rotation of the paddle, circulates in a continuous stream about a baffle 47. A base 48 serves as a support for a mercury switch 49 of usual construction provided with sets of contacts at each end, and leads 50 and 51 connect to the contacts at one end and leads 52 and 53 connect to the contacts at the other end of this mercury switch. The support 48 is pivoted at 54 and a counterweight 55 normally tends to maintain the support in its elevated position as shown in the present illustration of the invention with the mercury closing the circuit through leads 52 and 53, which position will hereafter be referred to as the initial position of the switch. Stops 56 and 57 limit the movement of the support and upon circulation of the liquid by the paddle wheel 44, it is moved to its second position to break the circuit through leads 52 and 53 and complete the circuit through leads 50 and 51. For a better understanding of the details of the switch, attention is directed to applicant's Patent No. 1,907,914, issued May 9, 1933.

The mercury switch 49 is included in the control system of the driving means for the exhauster and in the position illustrated operates to keep the engine from operation, as will be later explained. Upon rotation of the pulley 39 by a small electric motor 41 or other suitable means, the flow of liquid in the casing of the motion switch operates to move the mercury switch to its second position to complete the circuit through lines 50 and 51. When the mercury switch is in this position, it does not affect the operation of the exhauster engine. So long as the rotation of the shafts 32 and 36 continues, the mercury switch remains in this position and operation of the exhauster continues, but when the storage compartment of the tank becomes full, the heavy material rises in the exhaust compartment, and when the level of this heavy material reaches the paddle 31, sufficient resistance to movement is offered to overcome the driving force of the belt on the pulley 39 and the shafts 32 and 36 cease to rotate. Stopping of rotation of the shaft 36 results in a stopping of flow of fluid in the casing, thus permitting the mercury switch to return to its initial position in which it prevents the exhauster engine from operating.

The manner in which the mercury switch functions, as above described, in the apparatus illustrated is as follows. The engine 29 is provided with a control circuit shown in Fig. 5, which includes an ignition system generally designated 58 and comprising the usual distributor, plugs, etc. This system is grounded at 59 and receives its power through connection 72 from a high tension magneto 60 which is driven from the drive shaft of engine 29 in any suitable manner, such as by belt 61. A generator 62 driven from the engine drive shaft by belt 63 operates to charge a battery 64 through line 65. The engine is started by an engine starter 66 which can be connected to battery 64 by a starter switch 67, the switch being opened in the usual way as soon as the engine is in operation.

In its initial position with its right-hand end down, the mercury switch connects lines 52, 53 to ground and thus grounds the connection 72 between the magneto 60 and ignition system 58 through line 68 containing the normally closed switch 69. Switch 69 can be moved to close a second pair of contacts bridging lines 50, 51 leading to the left-hand end of the mercury switch and, when switch 69 bridges the second pair of contacts, a circuit is established from battery 64 through those contacts to a coil 71 which, upon energization, closes a switch 70 to connect motor 41 to the battery.

To start the apparatus in operation, switch 69 is moved to break the circuit between the connection 72 and ground and to bridge the contacts to which lines 50, 51 are connected. In this position of switch 69, current is supplied to coil 71 and switch 70 is closed so that current flows to motor 41 and the paddle wheel 44 is rotated. On such rotation of the paddle wheel, the mercury switch is tilted to its second position and this breaks the circuit between lines 52, 53 and connects lines 50, 51. Switch 69 is then released so that it returns to its initial position shown, and switch 67 is closed to operate the engine starter. As engine 29 is turned over by the starter, the magneto begins to supply current to the ignition system and when the engine is operating, switch 67 is opened. Engine 29 and motor 41 continue in operation so long as the mercury switch remains in its second position with lines 50, 51 connected through the switch. This condition of the mercury switch continues so long as paddle 31 is free to rotate, but when rotation of the paddle is halted by a rise in the material level, paddle 44 also stops rotating and the mercury switch then returns to its original position in which lines 52, 53 are connected and lines 50, 51 are unconnected. The connection of lines 52, 53 through the mercury switch grounds the connection 72 between the magneto 60 and ignition system 58 so that it stops supplying current to the ignition system of engine 29 and the latter stops operation. At the same time, the disconnection of line 50 from line 51 causes coil 71 to be deenergized, whereupon switch 70 opens and motor 41 is stopped. If it should be necessary to stop the operation of the conveying system at a time prior to the complete filling of the tank, this can be accomplished by closing a switch 72 which connects line 68 to ground.

By the use of the described apparatus in the present invention, the operator may start the exhauster to draw the material into the tank and after the exhauster engine has attained is operating speed, the operator can leave the apparatus and attend to the proper manipulation of the inlet nozzle, when such nozzle is used, with assurance that when the tank is filled with the desired quantity of material, the conveying operation will be automatically halted.

Under certain conditions, where the weight of material which may be transported on mobile trucks is limited by law, the present invention serves the additional purpose of insuring against an overload of the apparatus.

I claim:

1. In apparatus for conveying pulverulent and like materials, including a receiver for the material, an exhauster for establishing reduced pressure in the receiver to draw a stream of air and material into the receiver, and an internal combustion engine for operating the exhauster, the combination of a rotatable paddle within the receiver, a shaft for the paddle extending through a wall of the receiver, means connected to the shaft for rotating the shaft and paddle, so long as movement of the latter is unobstructed by material in the receiver, means connected to the control circuit of said engine for preventing operation of the engine when the paddle is at rest, and means movable with the paddle and operable on such movement to render ineffective said means connected to the control circuit.

2. In apparatus for conveying pulverulent and like materials, including a receiver for the material, an exhauster for establishing reduced pressure in the receiver to draw a stream of air and material into the receiver, and an internal combustion engine for operating the exhauster, the combination of a rotatable paddle within the receiver, a shaft for the paddle extending through a wall of the receiver, means connected to the shaft for rotating the shaft and paddle, so long as movement of the latter is unobstructed by material in the receiver, a switch in the control circuit of the engine movable between two positions and operable in one position to prevent operation of the engine, and means movable with the paddle and operable on such movement to move the switch to a second position in which it is ineffective to interfere with the operation of the engine.

3. In apparatus for conveying pulverulent and like materials, including a receiver for the material, an exhauster for establishing reduced pressure in the receiver to draw a stream of air and material into the receiver, and an internal combustion engine for operating the exhauster, the combination of a rotatable paddle within the receiver, a shaft for the paddle extending through a wall of the receiver, means connected to the shaft for rotating the shaft and paddle, so long as movement of the latter is unobstructed by material in the receiver, a switch in the control circuit of the engine biased to a position in which it prevents operation of the engine, and means movable with the paddle and operable on such movement to move the switch to a second position in which it is ineffective to interfere with the operation of the engine.

4. In apparatus for conveying pulverulent and like materials, including a receiver for the material, an exhauster for establishing reduced pressure in the receiver to draw a stream of air and material into the receiver, and an internal combustion engine for operating the exhauster, the combination of a rotatable paddle within the receiver, a shaft for the paddle extending through a wall of the receiver, a motor connected to the shaft for rotating the shaft and paddle, so long as the movement of the latter is unobstructed, a switch in the motor circuit, means for operating the motor switch, a switch in the control circuit of the engine and also controlling the means for operating the motor switch, said control circuit switch being biased to a position in which it prevents operation of said engine and renders said motor switch operating means ineffective, and means movable with the paddle and operable on such movement to move said control circuit switch to a second position in which it is ineffective to interfere with operation of the engine and effective to actuate said motor switch operating means to cause said motor switch to be closed to supply current to said motor.

5. In apparatus for conveying pulverulent and like materials, including a receiver for the material, an exhauster for establishing reduced pressure in the receiver to draw a stream of air and material into the receiver, and an internal combustion engine for operating the exhauster, the combination of a rotatable paddle within the receiver, a shaft for the paddle extending through a wall of the receiver, means connected to the shaft for rotating the shaft and paddle, so long as movement of the latter is unobstructed by material in the receiver, a mercury switch in the engine control circuit biased to a position in which it prevents operation of the engine, and means connected to the shaft outside the receiver and movable with the paddle, said means being operable during its movement to move the mercury switch to a second position in which it is ineffective to interfere with the operation of the engine.

PHILIP R. HORNBROOK.